(12) United States Patent
Wei et al.

(10) Patent No.: US 10,454,639 B2
(45) Date of Patent: Oct. 22, 2019

(54) D2D COMMUNICATION METHOD AND D2D COMMUNICATION APPARATUS

(71) Applicant: Beijing Zhigu Rui Tuo Tech Co., Ltd, Beijing (CN)

(72) Inventors: Na Wei, Beijing (CN); Weicai Huang, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 135 days.

(21) Appl. No.: 15/166,257

(22) Filed: May 27, 2016

(65) Prior Publication Data
US 2016/0352485 A1 Dec. 1, 2016

(30) Foreign Application Priority Data

May 29, 2015 (CN) .......................... 2015 1 0288695

(51) Int. Cl.
*H04L 5/00* (2006.01)
*H04W 52/28* (2009.01)
(Continued)

(52) U.S. Cl.
CPC ......... *H04L 5/0048* (2013.01); *H04B 1/1027* (2013.01); *H04L 5/0032* (2013.01); *H04L 5/0094* (2013.01); *H04W 52/244* (2013.01); *H04W 52/247* (2013.01); *H04W 52/283* (2013.01); *H04W 52/286* (2013.01); *H04L 5/0023* (2013.01); *H04W 16/28* (2013.01);
(Continued)

(58) Field of Classification Search
None
See application file for complete search history.

(56) References Cited

U.S. PATENT DOCUMENTS 9,319,124 B2 4/2016 Seol et al.
9,319,931 B2 4/2016 Lim et al.
(Continued)

FOREIGN PATENT DOCUMENTS

CN 101689911 A 3/2010
CN 101755394 A 6/2010
(Continued)

OTHER PUBLICATIONS

Fodor, et al. "A Distributed Power Control Scheme for Cellular Network Assisted D2D Communications", 2011 IEEE Global Telecommunications Conference (GLOBECOM 2011). Dec. 2011. 6 pages.
(Continued)

*Primary Examiner* — Angel T Brockman
(74) *Attorney, Agent, or Firm* — Amin, Turocy & Watson, LLP

(57) ABSTRACT

Device to device (D2D) communication is provided. A method comprises: acquiring information associated with a pilot channel resource used to send at least one directional pilot signal associated with directional D2D communication; and transmitting a data signal associated with the directional D2D communication at least according to a received state of the pilot signal on the pilot channel resource. Accordingly, a data signal associated with directional D2D communication can be transmitted more effectively according to a directional pilot signal related to the directional D2D communication.

26 Claims, 4 Drawing Sheets

(51) Int. Cl.
*H04B 1/10* (2006.01)
*H04W 52/24* (2009.01)
*H04W 16/28* (2009.01)
*H04W 76/14* (2018.01)
*H04W 72/04* (2009.01)

(52) U.S. Cl.
CPC ........ *H04W 52/245* (2013.01); *H04W 72/048* (2013.01); *H04W 76/14* (2018.02)

(56) References Cited

U.S. PATENT DOCUMENTS

| | | | |
|---|---|---|---|
| 9,781,731 | B2 | 10/2017 | Chen et al. |
| 9,820,287 | B2 | 11/2017 | Fujishiro et al. |
| 2007/0082692 | A1 | 4/2007 | Tirkkonen et al. |
| 2007/0287384 | A1 | 12/2007 | Sadri et al. |
| 2009/0015478 | A1 | 1/2009 | Li et al. |
| 2009/0019150 | A1 | 1/2009 | Li et al. |
| 2009/0046653 | A1 | 2/2009 | Singh et al. |
| 2011/0103317 | A1 | 5/2011 | Ribeiro et al. |
| 2013/0078991 | A1 | 3/2013 | Nam |
| 2013/0208587 | A1* | 8/2013 | Bala ............... H04W 16/14 370/230 |
| 2014/0153390 | A1 | 6/2014 | Ishii et al. |
| 2014/0219095 | A1 | 8/2014 | Lim |
| 2014/0235287 | A1 | 8/2014 | Maltsev et al. |
| 2014/0274088 | A1 | 9/2014 | Talwar et al. |
| 2014/0321367 | A1 | 10/2014 | Marupaduga et al. |
| 2015/0049736 | A1 | 2/2015 | Liu et al. |
| 2015/0119088 | A1 | 4/2015 | Lee et al. |
| 2015/0222345 | A1 | 8/2015 | Chapman et al. |
| 2015/0288427 | A1 | 10/2015 | Wang et al. |
| 2015/0373730 | A1 | 12/2015 | Fujishiro et al. |
| 2015/0382290 | A1* | 12/2015 | Yaacoub ........... H04W 52/0206 370/311 |
| 2016/0183286 | A1 | 6/2016 | Park et al. |
| 2016/0270106 | A1 | 9/2016 | Zhou et al. |
| 2016/0352484 | A1* | 12/2016 | Wei ............... H04L 5/0048 |
| 2016/0352485 | A1 | 12/2016 | Wei et al. |
| 2017/0041974 | A1 | 2/2017 | Liao et al. |

FOREIGN PATENT DOCUMENTS

| | | |
|---|---|---|
| CN | 102598844 A | 7/2012 |
| CN | 102833691 A | 12/2012 |
| CN | 103081380 A | 5/2013 |
| CN | 103716776 A | 4/2014 |
| CN | 103718514 A | 4/2014 |
| CN | 104113832 A | 10/2014 |
| CN | 104113851 A | 10/2014 |
| CN | 104244392 A | 12/2014 |
| CN | 104270712 A | 1/2015 |
| CN | 104284407 A | 1/2015 |
| CN | 104301984 A | 1/2015 |
| CN | 104488332 A | 4/2015 |
| WO | 2015005745 A1 | 1/2015 |

OTHER PUBLICATIONS

Yu, et al. "On the Performance of Device-to-Device Underlay Communication with Simple Power Control", IEEE 69th Vehicular Technology Conference, 2009. VTC Spring 2009. Apr. 2009. 5 pages.
Xing, et al. "The investigation of power control schemes for a device-to-device communication integrated into OFDMA cellular system", 2010 IEEE 21st International Symposium on Personal, Indoor and Mobile Radio Communications, Sep. 2010. 6 pages.
Office Action dated Oct. 6, 2017 for U.S. Appl. No. 15/167,809, 23 pages.
Office Action dated May 31, 2018 for U.S. Appl. No. 15/166,229, 31 pages.
Office Action dated May 25, 2018 for U.S. Appl. No. 15/166,252, 48 pages.
Office Action dated May 10, 2018 for U.S. Appl. No. 15/167,809, 18 pages.
Office Action dated Jan. 18, 2018 for U.S. Appl. No. 15/166,229, 34 pages.
Office Action dated Mar. 8, 2018 for U.S. Appl. No. 15/166,240, 24 pages.
Chinese Office Action for Chinese Application Serial No. 201510288807.4 dated Feb. 3, 2019, 7 pages.
Office Action dated Oct. 11, 2018 for U.S. Appl. No. 15/166,240, 27 pages.
Office Action dated Oct. 23, 2018 for U.S. Appl. No. 15/166,252, 24 pages.
Notice of Allowance dated Sep. 24, 2018 for U.S. Appl. No. 15/166,229, 25 pages.
Chinese Office Action for Chinese Application Serial No. 201510288695.2 dated Feb. 3, 2019, 6 pages.
Chinese Office Action for Chinese Application Serial No. 201510289747.8 dated Feb. 11, 2019, 6 pages.
Office Action dated Mar. 8, 2019 for U.S. Appl. No. 15/166,240, 20 pages.
Office Action dated Jun. 27, 2019 for U.S. Appl. No. 15/166,240, 25 pages.

* cited by examiner

D2D COMMUNICATION METHOD AND D2D COMMUNICATION APPARATUS

RELATED APPLICATION

The present application claims the benefit of priority to Chinese Patent Application No. 201510288695.2, filed with the Chinese Patent Office on May 29, 2015, and entitled "D2D COMMUNICATION CONTROL METHOD AND CONTROL APPARATUS", which application is hereby incorporated herein by reference in its entirety.

TECHNICAL FIELD

Embodiments of the present application relate to the field of device to device (D2D) technologies, and, for example, to a D2D communication method and a D2D communication apparatus.

BACKGROUND

D2D technologies allow direct communication between terminal devices, and therefore, frequency spectrum efficiency of a cellular communication system may be effectively improved, transmission power of a terminal is reduced, and a problem of lack of frequency spectrum resources of a wireless communication system may be solved to some extent. The D2D mode has been accepted by the 3GPP standards organizations, is applied to a long term evolution (LTE) communication system, and has a broad application prospect.

SUMMARY

In view of the foregoing, one example, non-limiting object of one or more example embodiments of the present application is to provide a D2D communication solution.

A first aspect of one or more example embodiments of the present application provides a D2D communication method, comprising:

acquiring information associated with a pilot channel resource used to send at least one directional pilot signal associated with directional D2D communication; and transmitting a data signal associated with the directional D2D communication at least according to a received state of the pilot signal on the pilot channel resource.

In a second aspect, an example embodiment of the present application provides a D2D communication apparatus, and the apparatus comprises:

a first acquisition module, configured to acquire information associated with a pilot channel resource used to send at least one directional pilot signal associated with directional D2D communication; and a transmitting module, configured to transmit a data signal associated with the directional D2D communication at least according to a received state of the pilot signal on the pilot channel resource In a third aspect, an example embodiment of the present application provides a computer readable storage device, comprising at least one executable instruction, which, in response to execution, causes a system comprising a processor to perform operations, comprising:

acquiring information associated with a pilot channel resource used to send at least one directional pilot signal associated with directional D2D communication; and transmitting a data signal associated with the directional D2D communication at least according to a received state of the pilot signal on the pilot channel resource.

In a fourth aspect, an example embodiment of the present application provides a device to device (DVD) communication device comprising a processor and memory, wherein the memory storing a computer executable instruction, the processor being connected with the memory via a communication bus, and when the device is operating, the processor executes or facilitates execution of the executable instructions stored by the memory:

acquiring information associated with a pilot channel resource used to send at least one directional pilot signal associated with directional D2D communication; and transmitting a data signal associated with the directional D2D communication at least according to a received state of the pilot signal on the pilot channel resource.

The method and apparatus of one or more example embodiments of the present application can transmit a data signal associated with directional D2D communication more effectively according to a directional pilot signal related to the directional D2D communication.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Figure 1:
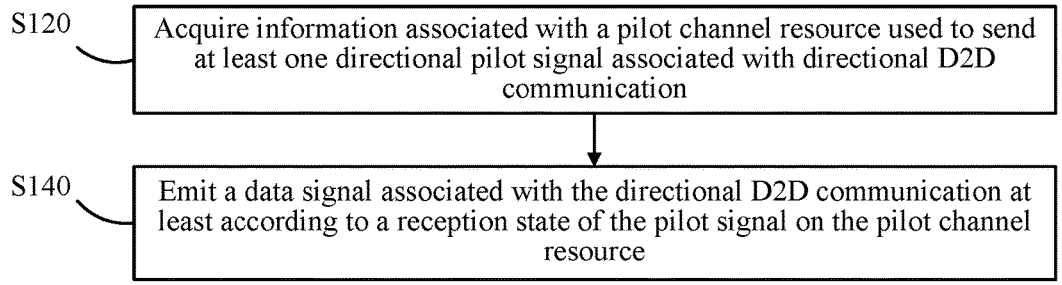
FIG. 1 is an example schematic flow chart of an example of a D2D communication method according to an example embodiment of the present application.

Example embodiments of the present application are further described in detail through accompanying drawings and embodiments. The following embodiments are used to describe the present application, but are not intended to limit the scope of the present application.

Persons skilled in the art should understand that terms such as "first" and "second" in the present application are merely used to distinguish different devices, modules, parameters or the like, and the terms neither represent any specific technical meanings nor indicate necessary logic orders of them.

In example embodiments of the present application, the term "directional device to device (D2D) communication" refers to D2D communication using directional transmission over a D2D communication link. The "directional transmission" refers to transmission of a radio frequency signal in a specific direction (also referred to as directed transmission) implemented with one or more directional transmitting antennas, and comprises: transmission in a specific sector direction, or transmission to one receiving end through multiple paths (for example, directional transmit implemented by conducting beam forming with a smart antenna technique).

In a D2D communication under partial cellular networks coverage application scenario, in the case where a D2D communication device uses a dedicated channel, communication in the cellular network will not be interfered. However, when the density of users in a cell is high, the D2D communication will share or reuse frequency resources of cellular users. When the D2D communication and cellular communication reuse the same wireless resource, mutual interference will occur. Along with development of intelligentization of terminals, more and more terminal devices start to have the directional transmission capability, for example, a terminal implements directional transmission in a manner of beam forming by being provided with a smart antenna. The directional transmission can form spatial separation of a D2D signal from an uplink signal of a co-frequency cellular user (a cellular user reusing a frequency the same as that of a D2D user to transmit signal), thereby reducing interference between a D2D user and the co-frequency cellular user. Appropriate control is implemented for possible directional D2D transmission, so as to reduce interference of a D2D user to a co-frequency cellular user, thereby implementing improvement of the overall throughput of the system. The embodiments of the present application provide a directional D2D communication solution based on possible directional transmission. A pilot signal is a known signal provided by a sender device to a receiver device and used for channel estimation or channel detection. In the embodiments of the present application, directed to the possible directional D2D transmission, a device (preferably, a sender device) involved in the directional D2D communication is enabled to send an uplink directional pilot signal, so as to implement the directional D2D communication according to the directional pilot signal associated with the directional D2D communication.

FIG. 1 is a flow chart of a D2D communication method according to this embodiment. The method may be executed by a sender device involved in directional D2D communication, and may also be executed by an independent apparatus. As shown in FIG. 1, the method comprises:

S120: Acquire information associated with a pilot channel resource used to send at least one directional pilot signal associated with directional D2D communication.

As described in the foregoing, the directional pilot signal refers to a pilot signal transmitting in a specific direction, implemented by means of one or more directional transmitting antennas, and the direction of the directional pilot signal is the same as the direction of the corresponding D2D communication, that is, the same as the direction of sending a data signal between both parties of communication involved in the directional D2D communication. The direction related to the to-be-implemented directional D2D communication may be determined already and unique, for example, uniquely determined by a sender device according to a position of a receiver device, and in this case, the direction of the corresponding directional pilot signal is also unique; the to-be-implemented directional D2D communication may further have two or more expected candidate directions, an appropriate direction is then determined according to communication performances, interference conditions and the like of each candidate direction, and correspondingly, each expected candidate direction also has a corresponding directional pilot signal. In other words, the at least one directional pilot signal comprises: at least one pilot signal in one direction, or at least one pilot signal in each direction when there are multiple directions. To better implement the directional D2D communication, in the method of this embodiment, a specific pilot channel resource allocated by the serving cellular cell base station involved in the directional D2D communication for the directional D2D communication is acquired. In an example embodiment, directed to each to-be-implemented directional D2D communication, one or more pilot channel resources used to send one or more directional pilot signals may be allocated. The one or more pilot channel resources may be channel resources that have been occupied by other cellular users, may be channel resources that are occupied by directional D2D communications in other directions, and may also be channel resources that have not been occupied by any user.

S140: Transmit a data signal associated with the directional D2D communication at least according to a received state of the pilot signal on the pilot channel resource.

According to the allocation condition of the pilot channel resource, the pilot signal on the pilot channel resource may comprise at least one directional pilot signal sent through the pilot channel resource, and may also comprise a non-directional pilot signal, that is, a pilot signal related to non-directional D2D communication. The received state refers to any information that can reflect the received condition of the pilot signal, and preferably comprises: the received-signal-strength of the pilot signal, and the like. The pilot signal is a signal used for monitoring/measurement, and according to the received condition of the pilot signal on the pilot channel resource, an interference condition, a channel quality and the like on a corresponding resource may be deduced. Because of the superior advantage of the directional D2D transmission in reducing interference between co-frequency cellular users, the method of this embodiment can transmit a data signal associated with the directional D2D communication according to specific conditions such as interference and channel quality.

In view of the foregoing, the method of this embodiment can transmit a data signal associated with directional D2D communication more effectively according to a directional pilot signal related to the directional D2D communication.

In an example embodiment, the step S140 may further comprise:

S141: Acquire a transmit power control strategy associated with the directional D2D communication, the transmit power control strategy being determined according to interference on the pilot channel resource caused by a signal associated with the directional D2D communication. In addition to the interference condition, transmit power levels that can be supported by different devices are different, and the transmit power control strategy may further be making a specific transmit power control strategy with reference to the maximum transmit power of at least the sender device involved in the directional D2D communication.

The interference on the pilot channel caused by the signal associated with the directional D2D communication may be determined by an execution apparatus of the method of this embodiment at least according to a received state of a pilot signal on the pilot channel resource, the interference condition may be fed back to the serving cellular cell base station as required, and the base station determines a transmit power control strategy according to the interference. Correspondingly, the method of this embodiment further comprises:

S130: At least according to the received state of the pilot signal on the pilot channel resource, determine interference on the pilot channel resource caused by the signal associated with the directional D2D communication.

Or, the interference may also be determined by the serving cellular cell base station according to the received state of the pilot signal on the pilot channel resource, and the base station further determines a transmit power control strategy according to the interference.

The transmit power control strategy directed to a directional D2D communication link not limited by an interference condition of a co-frequency cellular user (interference level of an uplink signal sent by the co-frequency cellular user to a base station caused by a signal transmitted on the D2D communication link) or less limited by an interference condition of a co-frequency cellular user may be determined. The transmit power control strategy comprises, but is not limited to, specification on the following parameters: a transmit power upper limit, sending of a power control command (comprising increasing and reducing the transmit power), and/or sending of any other parameter related to power adjustment.

Moreover, in order to determine the interference condition, the method of this embodiment further comprises the following step:

S150: Acquire information associated with the interference on the pilot channel resource caused by the signal associated with the directional D2D communication.

Specifically, the information associated with the interference may comprise the interference condition. For example, according to different roles of the execution apparatus of the method of this embodiment, interference condition that can be determined respectively by the serving cell base station involved in the directional D2D communication, a neighboring cell base station, another cellular user unrelated to the directional D2D communication may be acquired. Or, the information associated with the interference may comprise other information used to determine the interference, for example, other information that is used to determine the interference and will be further described in detail in the following.

It should be further noted that, the transmit power control strategy directed to a directional D2D communication link not limited by an interference condition of a co-frequency cellular user (interference level of an uplink signal sent by the co-frequency cellular user to a base station caused by a signal transmitted on the D2D communication link) or less limited by an interference condition of a co-frequency cellular user may be determined. The transmit power control strategy comprises, but is not limited to, specification on the following parameters: a transmit power upper limit, sending of a power control command (comprising increasing and reducing the transmit power), and/or sending of any other parameter related to power adjustment.

S142: Transmit the data signal at least according to the transmit power control strategy.

Moreover, the interference relates to to-be-implemented directional D2D communication, comprising measuring interference caused by at least one directional pilot signal associated with the to-be-implemented directional D2D communication, and may further comprise prediction on interference that may be caused on a data signal directionally transmitted in the process of the to-be-implemented directional D2D communication. Moreover, the interference may refer to a description on an interference condition, comprising: whether a determination of interference can be/has been made; interference level that can be calculated, and preferably, the interference level may be set: such as intense interference, medium interference and weak interference; another parameter associated with the interference that can be determined, for example, signal strength.

It should be noted that, in an example embodiment that the execution apparatus of the method of this embodiment determines the interference, the interference may be determined according to multiple indicators. In an example embodiment, the interference may be determined according to a received condition of the serving cellular cell base station involved in the directional D2D communication. That is, step S130 may comprise:

S131: Determine a first received state of a pilot signal received by the serving cellular cell base station involved in the directional D2D communication on the pilot channel resource.

Information associated with the first received state may be acquired in step S150.

S132: Determine the interference at least according to the first received state.

In another example embodiment, the interference may be determined according to a received condition of at least one neighboring cellular cell base station involved in the directional D2D communication. That is, step S130 may further comprise:

S133: Determine a second received state of a pilot signal received by the neighboring cell base station involved in the directional D2D communication on the pilot channel resource.

S134: Determine the interference at least according to the second received state.

Information associated with the second received state may be acquired in step S150.

In still another example embodiment, the interference may be determined according to received conditions of both the serving cellular cell base station and at least one neighboring cellular cell base station involved in the directional D2D communication. That is, step S130 may further comprise:

S135: Determine a first received state of a pilot signal received by the serving cell base station involved in the directional D2D communication on the pilot channel resource, and a second received state of a pilot signal received by a neighboring cell base station involved in the directional D2D communication on the pilot channel resource.

S136: Determine the interference at least according to the first received state and the second received state.

Information associated with the first received state and the second received state may be acquired in step S150.

Alternatively, the received state may comprise: first received strength of the at least one directional pilot signal on the pilot channel resource, that is, the received strength of the at least one directional pilot signal can be determined, and possible interference may be determined according to the received strength of the pilot signal. The first received state is the received strength of the at least one directional pilot signal received by the serving cellular cell base station involved in the directional D2D communication on the pilot channel resource; and the second received state is the received strength of the at least one directional pilot signal received by the at least one neighboring cellular cell base station involved in the directional D2D communication on the pilot channel resource. The base stations may distinguish the directional pilot signals according to, for example, a pilot configuration, or according to directivity of each pilot signal. Information associated with the first received strength may also be acquired in step S150.

Correspondingly, in step S132 or step S134 or step S136, the interference may be determined at least according to the first received strength and at least one preset strength threshold.

Alternatively, according to experiences or requirements of quality of service, at least one preset strength threshold or threshold range is set, and whether interference exists or interference level is determined according to comparison between the first received strength and the at least one preset strength threshold. For example, when the first received strength is within an intense interference threshold range, it is determined that directional D2D communication associated with the corresponding directional pilot signal will cause intense interference on the corresponding channel resource; when the first received strength is lower than an interference strength lower limit, it is determined that no interference occurs, and the like.

Alternatively, the received state may further comprise: the first received strength of the at least directional pilot signal on the pilot channel resource and a second received strength of a pilot signal unrelated to the directional D2D communication. Information associated with the second received strength may also be acquired in step S150.

In this case, in step S132 or step S134 or step S136, the interference may be determined at least according to the first received strength and the second received strength, that is, the interference is determined under comprehensive consideration of interference conditions of the serving cell base station and the neighboring cell base station caused by the directional D2D communication.

In another example embodiment, step S140 may further comprise:

S143: Determine interference on the pilot channel resource caused by a signal associated with the directional D2D communication. The manner of determining the interference may be acquired, for example, with reference to the descriptions made in step S130.

S144: Determine at least one target transmit direction associated with the directional D2D communication at least according to the interference and a third received state of the at least one directional pilot signal received by the receiver device involved in the directional D2D communication.

In such an example embodiment, a final transmit direction of the directional D2D communication is not determined yet, for example, there are two or more expected candidate directions, and correspondingly, there are at least one directional pilot signal corresponding to each expected candidate direction. An ideal target transmit direction can be determined according to interference on pilot channel resources corresponding to the pilot signals in different directions and channel quality conditions.

As described in the foregoing, the third received state may comprise: received strength of at least one directional pilot signal corresponding to each direction received by the receiver device involved in the directional D2D communication on the pilot channel resource, which reflects a reception effect that can be implemented in the corresponding direction. Ideal at least one target transmit direction may be determined under comprehensive consideration of the interference that may be caused by the directional D2D communication in various directions and reception effects that can be implemented by the directional D2D communication in various directions. For example, at least one target transmit direction in which interference is within a certain degree of range and the optimal reception effect can be implemented is determined.

In such an example embodiment, in step S142, the data signal may be transmitted at least according to the transmit power control strategy and the at least one target transmit direction.

In another example embodiment, the step S140 may further comprise:

S145: Acquire information associated with resource allocation associated with the directional D2D communication, that is, a time-frequency resource that should be used in transmitting the data signal associated with the directional D2D communication.

The resource allocation may be allocated by the base station of the serving cellular cell, the execution apparatus of the method of this embodiment, at least according to the interference and the third received state of the at least one directional pilot signal received by the receiver device involved in the directional D2D communication, and in step S145, information associated with the resource allocation condition may be received by communicating with the base station.

Specifically, the base station of the cell to which the execution apparatus of the method of this embodiment attaches may allocate the same pilot channel resource for respective at least one directional pilot signal related to two or more directional D2D communication. According to the interference determined in step S130, interference caused by a directional pilot signal related to each D2D communication on each pilot channel resource and/or interference that might be caused by a data signal may be determined. A received condition of a data signal related to each D2D communication and sent on each pilot channel resource may be determined according to the third received state, and in consideration of factors in both aspects, an ideal resource allocation strategy for each directional D2D communication may be determined. For example, the same time-frequency resource is allocated for two or more directional D2D communication that has low mutual interference and has desirable received conditions, so as to transmit data signals.

In such an example embodiment, in step S142, the data signal may be transmitted at least according to the transmit power control strategy and the resource allocation.

Moreover, the method of this embodiment may further comprise:

S160: Send at least one directional pilot signal at least on the received pilot channel resource.

A person skilled in the art should understand that in the above method of the example embodiment of the present application, serial numbers of steps do not indicate priorities of execution sequences, the execution sequences of the steps should be determined according to functions and inner logic thereof, and should not constitute a limitation to the example embodiments of the present application.

In addition, an embodiment of the present application further provides a computer readable medium, comprising computer readable instructions for performing the following operations when being executed: executing operations of the steps in the method in the example embodiment shown in FIG. 1.

Figure 2A:
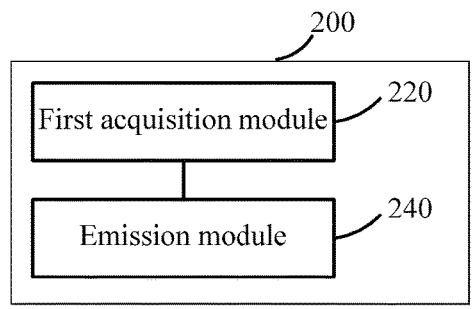
FIG. 2(a) to FIG. 2(h) are example schematic structural diagrams of various examples of a D2D communication apparatus according to an example embodiment of the present application.

An embodiment of the present application further provides an apparatus for executing the D2D communication method, and FIG. 2(a) is a structural diagram of an exemplary D2D communication apparatus. The apparatus may belong to a sender device involved in the directional D2D communication, and may also be an independent apparatus. As shown in FIG. 2(a), the apparatus 200 comprises: a first acquisition module 220 and a transmitting module 240.

The first acquisition module 220 is configured to acquire a pilot channel resource used to send at least one directional pilot signal associated with directional D2D communication.

As described in the foregoing, the directional pilot signal refers to a pilot signal transmitting in a specific direction, implemented by means of one or more directional transmitting antennas, and the direction of the directional pilot signal is the same as the direction of the corresponding D2D communication, that is, the same as the direction of sending a data signal between both parties of communication involved in the directional D2D communication. The direction related to the to-be-implemented directional D2D communication may be determined already and unique, for example, uniquely determined by a sender device according to a position of a receiver device, and in this case, the direction of the corresponding directional pilot signal is also unique; the to-be-implemented directional D2D communication may further have two or more expected candidate directions, an appropriate direction is then determined according to communication performances, interference conditions and the like of each candidate direction, and correspondingly, each expected candidate direction also has a corresponding directional pilot signal. In other words, the at least one directional pilot signal comprises: at least one pilot signal in one direction, or at least one pilot signal in each direction when there are multiple directions. To better implement the directional D2D communication, in the apparatus of this embodiment, the received module 220 receives information associated with a specific pilot channel resource allocated by the serving cellular cell base station involved in the directional D2D communication for the directional D2D communication, and determines the pilot channel resource. In an example embodiment, directed to each to-be-implemented directional D2D communication, one or more pilot channel resources used to send one or more directional pilot signals may be allocated. The one or more pilot channel resources may be channel resources that have been occupied by other cellular users, may be channel resources that are occupied by directional D2D communications in other directions, and may also be channel resources that have not been occupied by any user.

The transmitting module 240 is configured to transmit a data signal associated with the directional D2D communication at least according to a received state of the pilot signal on the pilot channel resource.

According to the allocation condition of the pilot channel resource, the pilot signal on the pilot channel resource may comprise at least one directional pilot signal sent through the pilot channel resource, and may also comprise a non-directional pilot signal, that is, a pilot signal related to non-directional D2D communication. The received state refers to any information that can reflect the received condition of the pilot signal, and preferably comprises: the received-signal-strength of the pilot signal, and the like. The pilot signal is a signal used for monitoring/measurement, and according to the received condition of the pilot signal on the pilot channel resource, an interference condition, a channel quality and the like on a corresponding resource may be deduced. Because of the superior advantage of the directional D2D transmission in reducing interference between co-frequency cellular users, the method of this embodiment can transmit a data signal associated with the directional D2D communication according to specific conditions such as interference and channel quality.

In view of the foregoing, the apparatus of this embodiment can transmit a data signal associated with directional D2D communication more effectively according to a directional pilot signal related to the directional D2D communication.

Figure 2B:
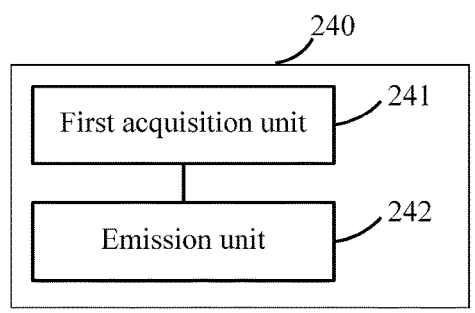

In an example embodiment, as shown in FIG. 2(b), the transmitting module 240 may further comprise:

a first acquisition unit 241, configured to acquire a transmit power control strategy associated with the directional D2D communication, the transmit power control strategy being determined according to interference on the pilot channel resource caused by a signal associated with the directional D2D communication. In addition to the interference condition, transmit power levels that can be supported by different devices are different, and the transmit power control strategy may further be making a specific transmit power control strategy with reference to the maximum transmit power of at least the sender device involved in the directional D2D communication.

Figure 2C:
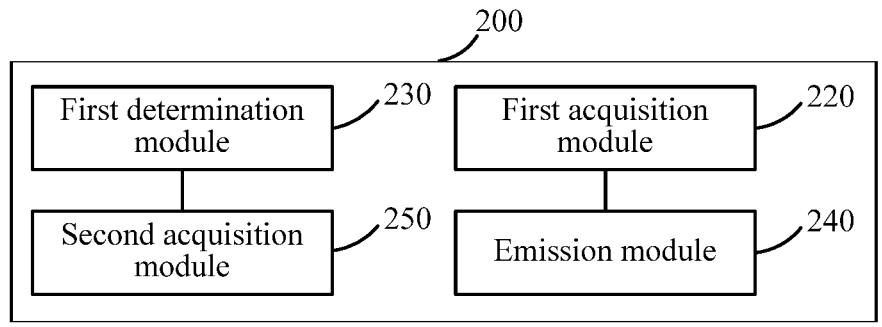
Figure 2D:
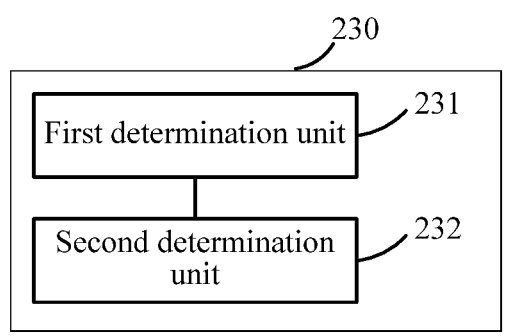
Figure 2E:
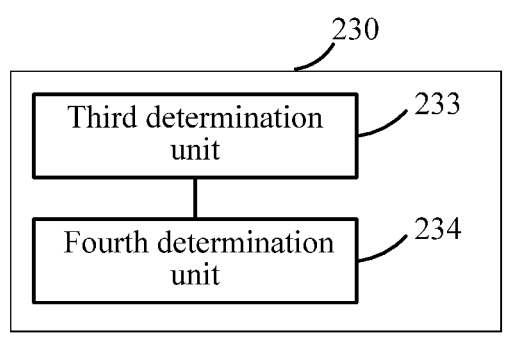
Figure 2F:
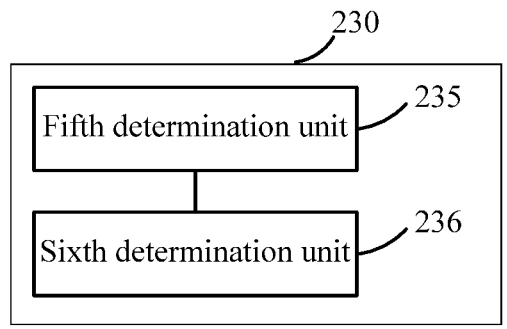

The interference on the pilot channel caused by the signal associated with the directional D2D communication may be determined by the apparatus of this embodiment at least according to a received state of the pilot signal on the pilot channel resource, the interference condition may be fed back to the serving cellular cell base station as required, and the base station determines a transmit power control strategy according to the interference. Correspondingly, as shown in FIG. 2(c), the apparatus 200 of this embodiment further comprises:

a first determination module 230, configured to: at least according to the received state of the pilot signal on the pilot channel resource, determine interference on the pilot channel resource caused by the signal associated with the directional D2D communication.

Or, the interference may also be determined by the serving cellular cell base station according to the received state of the pilot signal on the pilot channel resource, and the base station further determines a transmit power control strategy according to the interference.

The transmit power control strategy directed to a directional D2D communication link not limited by an interference condition of a co-frequency cellular user (interference level of an uplink signal sent by the co-frequency cellular user to a base station caused by a signal transmitted on the D2D communication link) or less limited by an interference condition of a co-frequency cellular user may be determined. The transmit power control strategy comprises, but is not limited to, specification on the following parameters: a transmit power upper limit, sending of a power control command (comprising increasing and reducing the transmit power), and/or sending of any other parameter related to power adjustment.

Moreover, in order to determine the interference condition, the apparatus 200 of this embodiment further comprises: a second acquisition module 250 and a transmitting unit 242.

The second acquisition module 250 is configured to acquire information associated with the interference on the pilot channel resource caused by the signal associated with the directional D2D communication.

Specifically, the information associated with the interference may comprise the interference condition. For example, according to different roles of the execution body of the method of this embodiment, interference condition that can be determined respectively by the serving cell base station involved in the directional D2D communication, a neighboring cell base station, another cellular user unrelated to the directional D2D communication may be acquired. Or, the information associated with the interference may comprise other information used to determine the interference, for example, other information used to determine the interference that will be further described in detail in the following.

It should be further noted that, the transmit power control strategy directed to a directional D2D communication link not limited by an interference condition of a co-frequency cellular user (interference level of an uplink signal sent by the co-frequency cellular user to a base station caused by a signal transmitted on the D2D communication link) or less limited by an interference condition of a co-frequency cellular user may be determined. The transmit power control strategy comprises, but is not limited to, specification on the following parameters: a transmit power upper limit, sending of a power control command (comprising increasing and reducing the transmit power), and/or sending of any other parameter related to power adjustment.

The transmitting unit 242 is configured to transmit the data signal at least according to the transmit power control strategy.

Moreover, the interference relates to to-be-implemented directional D2D communication, comprising measuring interference caused by at least one directional pilot signal associated with the to-be-implemented directional D2D communication, and may further comprise prediction on interference that may be caused on a data signal directionally transmitted in the process of the to-be-implemented directional D2D communication. Moreover, the interference may refer to a description on an interference condition, comprising: whether a determination of interference can be/has been made; interference level that can be calculated, and preferably, interference level may be set: such as intense interference, medium interference and weak interference; another parameter associated with the interference that can be determined, for example, signal strength.

It should be noted that, in an example embodiment that the apparatus of this embodiment determines the interference, the interference may be determined according to multiple indicators. In an example embodiment, the interference may be determined according to a received condition of the serving cellular cell base station involved in the directional D2D communication. That is, as shown in FIG. 2(*d*), the first determination module 230 may further comprise: a first determination unit 231 and a second determination unit 232.

The first determination unit 231 is configured to determine a first received state of a pilot signal received by the serving cellular cell base station involved in the directional D2D communication on the pilot channel resource.

The second acquisition module 250 may acquire information associated with the first received state.

The second determination unit 232 is configured to determine the interference at least according to the first received state.

In another example embodiment, the interference may be determined according to a received condition of at least one neighboring cellular cell base station involved in the directional D2D communication. That is, as shown in FIG. 2(*e*), the first determination module 230 may further comprise: a third determination unit 233 and a fourth determination unit 234.

The third determination unit 233 is configured to determine a second received state of a pilot signal received by the neighboring cellular cell base station involved in the directional D2D communication on the pilot channel resource.

The second acquisition module 250 may acquire information associated with the second received state.

The fourth determination unit 234 is configured to determine the interference at least according to the second received state.

In still another example embodiment, the interference may be determined according to received conditions of both the serving cellular cell base station and at least one neighboring cellular cell base station involved in the directional D2D communication. That is, as shown in FIG. 2(*f*), the first determination module 230 may further comprise: a fifth determination unit 235 and a sixth determination unit 236.

The fifth determination unit 235 is configured to determine a first received state of a pilot signal received by the serving cellular cell base station involved in the directional D2D communication on the pilot channel resource, and a second received state of a pilot signal received by the neighboring cell base station involved in the directional D2D communication on the pilot channel resource. The second acquisition module 250 may acquire information associated with the first received state and the second received state.

The sixth determination unit 236 is configured to determine the interference at least according to the first received state and the second received state.

Alternatively, the received state may comprise: first received strength of the at least one directional pilot signal on the pilot channel resource, that is, the received strength of the at least one directional pilot signal can be determined, and possible interference may be determined according to the received strength of the pilot signal. The first received state is the received strength of the at least one directional pilot signal received by the serving cellular cell base station involved in the directional D2D communication on the pilot channel resource; and the second received state is the received strength of the at least one directional pilot signal received by the at least one neighboring cellular cell base station involved in the directional D2D communication on the pilot channel resource. The base stations may distinguish the directional pilot signals according to, for example, a pilot configuration, or according to directivity of each pilot signal. The second acquisition module 250 may acquire information associated with the first received strength.

Correspondingly, the first determination module 230 may determine the interference at least according to the first received strength and at least one preset strength threshold.

Alternatively, according to experiences or requirements of quality of service, at least one preset strength threshold or threshold range is set, and whether interference exists or interference level is determined according to comparison between the first received strength and the at least one preset strength threshold. For example, when the first received strength is within an intense interference threshold range, it is determined that directional D2D communication associated with the corresponding directional pilot signal will cause intense interference on the corresponding channel resource; when the first received strength is lower than interference strength lower limit, it is determined that no interference occurs, and the like.

Alternatively, the received state may further comprise: the first received strength of the at least directional pilot signal on the pilot channel resource and a second received strength of a pilot signal unrelated to the directional D2D communication. The second acquisition module 250 may acquire information associated with the second received strength.

In this case, the first determination module 230 may determine the interference at least according to the first received strength and the second received strength, that is, the interference is determined under comprehensive consideration of interference conditions of the serving cell base station and the neighboring cell base station caused by the directional D2D communication.

Figure 2G:
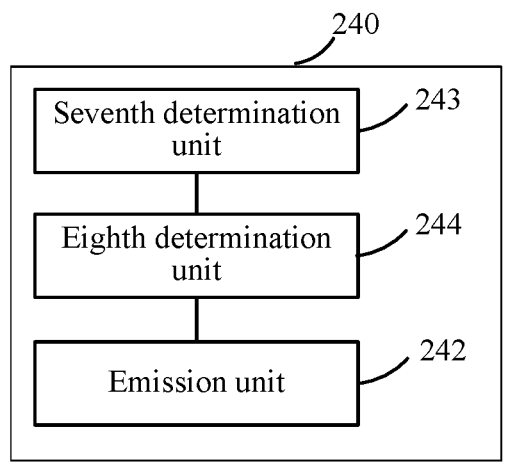

In another example embodiment, as shown in FIG. 2(g), the transmitting module 240 may further comprise: a seventh determination unit 243 and an eighth determination unit 244.

The seventh determination unit 243 is configured to determine interference on the pilot channel resource caused by a signal associated with the directional D2D communication.

The manner of the seventh determination unit 243 determining the interference is the same as that described with reference to the first determination module 230, or, the two are the same module.

The eighth determination unit 244 is configured to determine at least one target transmit direction associated with the directional D2D communication at least according to the interference and the third received state of the at least one directional pilot signal received by the receiver device involved in the directional D2D communication.

In such an example embodiment, a final transmit direction of the directional D2D communication is not determined yet, for example, there are two or more expected candidate directions, and correspondingly, there are at least one directional pilot signal corresponding to each expected candidate direction. An ideal target transmit direction can be determined according to interference on pilot channel resources corresponding to the pilot signals in different directions and channel quality conditions.

As described in the foregoing, the third received state may comprise: received strength of at least one directional pilot signal corresponding to each direction received by the receiver device involved in the directional D2D communication on the pilot channel resource, which reflects a reception effect that can be implemented in the corresponding direction. Ideal at least one target transmit direction may be determined under comprehensive consideration of the interference that may be caused by the directional D2D communication in various directions and reception effects that can be implemented by the directional D2D communication in various directions. For example, at least one target transmit direction in which interference is within a certain degree of range and the optimal reception effect can be implemented is determined.

In such an example embodiment, the transmitting unit 243 may transmit the data signal at least according to the transmit power control strategy and the at least one target transmit direction.

Figure 2H:
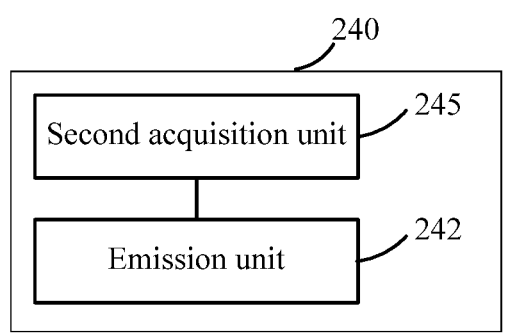

In still another example embodiment, as shown in FIG. 2(h), the transmitting module 240 may further comprise:

a second acquisition unit 245, configured to acquire information associated with resource allocation associated with the directional D2D communication, that is, a time-frequency resource that should be used in transmitting the data signal associated with the directional D2D communication.

The resource allocation may be allocated by the base station of the serving cellular cell, the execution body of the method of this embodiment, at least according to the interference and the third received state of the at least one directional pilot signal received by the receiver device involved in the directional D2D communication, and the third determination unit 244 may receive information associated with the resource allocation condition by communicating with the base station.

Specifically, the base station of the cell to which the execution body of the method of this embodiment attaches may allocate the same pilot channel resource for respective at least one directional pilot signal related to two or more directional D2D communication. According to the interference determined by the first determination module 230, interference caused by a directional pilot signal involved in each D2D communication on each pilot channel resource and/or interference that might be caused by a data signal may be determined. A received condition of a data signal related to each D2D communication and sent on each pilot channel resource may be determined according to the third received state, and in consideration of factors in both aspects, an ideal resource allocation strategy for each directional D2D communication may be determined. For example, the same time-frequency resource is allocated for two or more directional D2D communication that has low mutual interference and has desirable received conditions, so as to transmit data signals.

In such an example embodiment, the transmitting unit 242 may transmit the data signal at least according to the transmit power control strategy and the resource allocation.

Further, the transmitting module 240 may further be configured to send at least one directional pilot signal at least on the received pilot channel resource.

Figure 3:
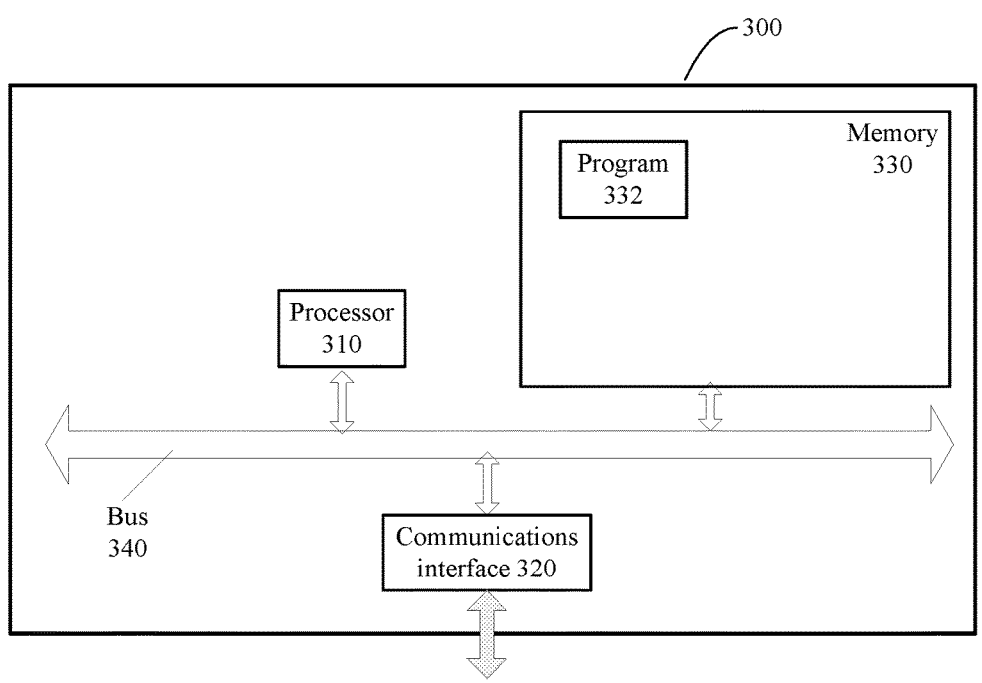
FIG. 3 is an example schematic structural diagram of another example of a D2D communication apparatus according to an example embodiment of the present application.

FIG. 3 is a schematic structural diagram of a D2D communication apparatus 300 provided in an embodiment of the present application, and the specific implementation of the D2D communication apparatus 300 is not limited in the implementation of the present application. As shown in FIG. 3, the D2D communication apparatus 300 may comprise:

A processor 310, a communications interface 320, a memory 330, and a communications bus 340, where:

The processor 310, the communications interface 320, and the memory 330 complete mutual communications with each other through the communications bus 340.

The communications interface 320 is configured to communicate with a network element such as a client.

The processor 310 is configured to execute a program 332, and specifically can implement related functions of the D2D communication apparatus in the apparatus embodiment of FIG. 2(a).

Specifically, the program 332 may comprise a program code. The program code comprises a computer operating instruction.

The processor 310 may be a central processing unit CPU or an Application Specific Integrated Circuit (ASIC), or be configured to be one or more integrated circuits configured to implement the embodiments of the present application. The program 332 may specifically used to cause the D2D communication apparatus 300 to execute the following steps:

acquiring information associated with a pilot channel resource used to send at least one directional pilot signal associated with directional D2D communication; and at least according to a received state of the pilot signal on the received pilot channel resource, transmitting a data signal associated with the directional D2D communication.

Specific implementations of all steps in the program 332 may be referred to in the corresponding descriptions of the corresponding steps or units in the above embodiments, and are not repeated herein. It can be clearly understood by persons skilled in the art that, for the purpose of convenient and brief description, for a detailed working process of the described devices and modules, reference may be made to the corresponding process in the foregoing method embodiment, and the details will not be described herein again.

It can be clearly understood by persons skilled in the art that, for the purpose of convenient and brief description, for a detailed working process of the described devices and modules, reference may be made to the corresponding descriptions in the foregoing apparatus embodiment, and the details will not be described herein again.

Although the theme described herein is provided in a general context executed in combination with the operating system and execution of an application on a computer system, a person skilled in the art may know that other implementations may also be executed in combination with other types of program modules. Generally speaking, the program module comprises a routine, a program, a component, a data structure and other types of structures used to execute a specific task or implement a specific abstract data type. A person skilled in the art may understand that, the theme described herein may be implemented by using another computer system configuration, comprising a handheld device, a multi-processor system, a micro-processor based or programmable consumer electronic product, a small-size computer, a large-size computer, and the like, and may also be used in a allocated computing environment in which a task is executed by using remote processing devices connection through a communications network. In the allocated computing environment, the program module may be located in storage devices of both the serving memory and a remote memory.

Persons of ordinary skill in the art should appreciate that, in combination with the examples described in the embodiments herein, units and method steps can be implemented by electronic hardware, or a combination of computer software and electronic hardware. Whether the functions are executed by hardware or software depends on specific applications and design constraint conditions of the technical solutions. Persons skilled in the art can use different methods to implement the described functions for every specific application, but it should not be considered that this implementation goes beyond the scope of the present application.

When being implemented in the form of a software functional unit and sold or used as a separate product, the functions may be stored in a computer-readable storage medium. Based on such understanding, the example embodiments essentially, or part of the technical solutions may be implemented in a form of a software product. The computer software product is stored in a storage medium, and comprises several instructions for instructing a computer device (which may be a personal computer, a server, a network device, and the like) to execute all or part of the steps of the method described in each of the embodiments of the present application. The computer readable storage medium comprises a physically volatile and non-volatile, mobile, and non-mobile medium that is implemented by any manner or technology for storing information such as a computer readable instruction, a data structure, a program module, or other data. The computer readable storage medium specifically comprises, but is not limited to, a USB disk, a mobile hard disk, a Read-Only Memory (ROM), a Random Access Memory (RAM), an Erasable Programmable Read-Only Memory (EPROM), an electrically Erasable Programmable Read-Only Memory (EEPROM), a flash memory or another solid-state memory technology, a CD-ROM, a digital versatile disc (DVD), an HD-DVD, a Blue-Ray or another optical storage device, a magnetic tape, a magnetic disk storage or another magnetic storage device, or any other medium that can be used to store required information and can be accessed by the computer.

The aforementioned description of the example embodiments are merely provided for describing the present application, but not intended to limit the present application. Persons of ordinary skills in the art can also make many variations and changes without departing from the spirit and the scope of the present application. Therefore, all the equivalent technical solutions also fall within the scope of the present application, and the patent protection scope of the present application shall be limited by the claims.

What is claimed is:

1. A method, comprising:
    acquiring, by a system comprising a processor, information associated with a pilot channel resource used to send at least one directional pilot signal associated with a directional device to device (D2D) communication, wherein the directional D2D communication refers to D2D communication using directional transmission over a D2D communication link, the directional transmission refers to transmission of a radio frequency signal in a first specific direction, and the at least one directional pilot signal refers to at least one pilot signal transmitting in a second specific direction; and
    transmitting a data signal associated with the directional D2D communication at least according to a received state of the at least one directional pilot signal on the pilot channel resource,
    wherein a direction associated with the directional D2D communication is determined by one party of both parties of communication according to a position of the other party, or determined from two or more candidate directions according to communication performances and interference conditions of the two or more candidate directions.

2. The method of claim 1, wherein the transmitting the data signal comprises: acquiring a transmit power control strategy associated with the directional D2D communication, the transmit power control strategy being determined according to interference on the pilot channel resource caused by a signal associated with the directional D2D communication; and
    transmitting the data signal at least according to the transmit power control strategy.

3. The method of claim 1, wherein the received state is a first received state, wherein the transmitting the data signal comprises: determining interference on the pilot channel resource caused by a signal associated with the directional D2D communication; and
    determining at least one target transmit direction associated with the directional D2D communication at least according to interference and a second received state of the at least one directional pilot signal received by the receiver device involved in the directional D2D communication, and
    wherein the transmitting the data signal at least according to the transmit power control strategy further comprises:
        transmitting the data signal at least according to the transmit power control strategy and the at least one target transmit direction.

4. The method of claim 1, wherein the transmitting the data signal comprises:
    acquiring information associated with a resource allocation associated with the directional D2D communication, the resource allocation being determined at least according to interference on the pilot channel resource caused by a signal associated with the directional D2D communication and a second received state of the at least one directional pilot signal received by a receiver device involved in the directional D2D communication, and wherein the transmitting the data signal at least according to the transmit power control strategy further comprises:
  transmitting the data signal at least according to the transmit power control strategy and the resource allocation.

5. The method of claim 1, further comprising:
at least according to the received state of the at least one directional pilot signal on the pilot channel resource, determining an interference on the pilot channel resource caused by a signal associated with the directional D2D communication.

6. The method of claim 5, wherein the received state is a first received state, and wherein the determining the interference comprises:
  determining a second received state of a pilot signal that was received by a serving cell base station device involved in the directional D2D communication on the pilot channel resource; and
  determining the interference at least according to the second received state.

7. The method of claim 5, wherein the received state is a first received state, and wherein the determining the interference comprises:
  determining a second received state of a pilot signal that was received by a neighboring cell base station device involved in the directional D2D communication on the pilot channel resource; and
  determining the interference at least according to the second received state.

8. The method of claim 5, wherein the received state is a first received state, and wherein the determining the interference comprises:
  determining a second received state of a first pilot signal that was received by a serving cell base station device involved in the directional D2D communication on the pilot channel resource, and a third received state of a second pilot signal that was received by a neighboring cell base station device involved in the directional D2D communication on the pilot channel resource; and
  determining the interference at least according to the second received state and the third received state.

9. The method of claim 6, wherein the first received state comprises: a first received strength of the at least one directional pilot signal on the pilot channel resource, and
  wherein the determining the interference comprises:
    determining the interference at least according to the first received strength and at least one preset strength threshold.

10. The method of claim 6, wherein the first received state comprises:
  a first received strength of the at least one directional pilot signal on the pilot channel resource and a second received strength of a pilot signal unrelated to the directional D2D communication, and
  wherein the determining the interference comprises:
    determining the interference at least according to the first received strength and the second received strength.

11. The method of claim 1, further comprising:
acquiring information associated with the interference on the pilot channel resource caused by a signal associated with the directional D2D communication.

12. The method of claim 1, further comprising:
transmitting the at least one directional pilot signal at least on the pilot channel resource.

13. An apparatus, comprising:
a memory that stores executable modules; and
a processor, coupled to the memory, that executes or facilitates execution of the executable modules, the executable modules comprising:
  a first acquisition module configured to acquire information associated with a pilot channel resource used to send a directional pilot signal associated with a directional device to device (D2D) communication, wherein the directional D2D communication refers to D2D communication using directional transmission over a D2D communication link, the directional transmission refers to transmission of a radio frequency signal in a first specific direction, and the directional pilot signal refers to a pilot signal transmitting in a second specific direction; and
  a transmitting module configured to transmit a data signal associated with the directional D2D communication at least according to a first received state of the directional pilot signal on the pilot channel resource,
  wherein a direction associated with the directional D2D communication is determined by one party of both parties of communication according to a position of the other party, or determined from two or more candidate directions according to communication performances and interference conditions of the two or more candidate directions.

14. The apparatus of claim 13, wherein the transmitting module comprises:
  a first acquisition unit configured to acquire a transmit power control strategy associated with the directional D2D communication, the transmit power control strategy being determined according to an interference on the pilot channel resource caused by a signal associated with the directional D2D communication; and
  a transmitting unit configured to transmit the data signal at least according to the transmit power control strategy.

15. The apparatus of claim 13, wherein the transmitting module further comprises:
  a seventh determination unit configured to determine an interference on the pilot channel resource caused by a signal associated with the directional D2D communication; and
  an eighth determination unit configured to determine a target transmit direction associated with the directional D2D communication at least according to the interference and a second received state of the directional pilot signal received by the receiver device involved in the directional D2D communication, and wherein the transmitting unit is further configured to transmit the data signal at least according to the transmit power control strategy and the target transmit direction.

16. The apparatus of claim 13, wherein the transmitting module further comprises:
  a second acquisition unit configured to acquire information associated with a resource allocation associated with the directional D2D communication, the resource allocation being determined at least according to an interference on the pilot channel resource caused by a signal associated with the directional D2D communication and a second received state of the directional pilot signal received by a receiver device involved in the directional D2D communication, and wherein the transmitting unit is further configured to transmit the data signal at least according to the transmit power control strategy and the resource allocation.

17. The apparatus of claim 13, wherein the executable modules further comprise:
a first determination module configured to: at least according to the first received state of the directional pilot signal on the pilot channel resource, determine an interference on the pilot channel resource caused by a signal associated with the directional D2D communication.

18. The apparatus of claim 17, wherein the first determination module comprises:
a first determination unit configured to determine a second received state of a pilot signal received by a serving cellular cell base station device involved in the directional D2D communication on the pilot channel resource; and
a second determination unit configured to determine the interference at least according to the second received state.

19. The apparatus of claim 17, wherein the first determination module comprises:
a third determination unit configured to determine a second received state of a pilot signal received by a neighboring cellular cell base station device involved in the directional D2D communication on the pilot channel resource; and
a fourth determination unit configured to determine the interference at least according to the second received state.

20. The apparatus of claim 17, wherein the first determination module comprises:
a fifth determination unit configured to determine a second received state of a pilot signal received by a serving cellular cell base station device involved in the directional D2D communication on the pilot channel resource, and a third received state of another pilot signal received by a neighboring cell base station device involved in the directional D2D communication on the pilot channel resource; and
a sixth determination unit configured to determine the interference at least according to the second received state and the third received state.

21. The apparatus of claim 18, wherein the first received state comprises: a first received strength of the directional pilot signal on the pilot channel resource, and
wherein the first determination module is configured to determine the interference at least according to the first received strength and a preset strength threshold.

22. The apparatus of claim 18, wherein the first received state comprises: a first received strength of the directional pilot signal on the pilot channel resource and a second received strength of a pilot signal unrelated to the directional D2D communication, and
wherein the first determination module is configured to determine the interference at least according to the first received strength and the second received strength.

23. The apparatus of claim 13, wherein the executable modules further comprise:
a second acquisition module configured to acquire information associated with an interference on the pilot channel resource caused by a signal associated with the directional D2D communication.

24. The apparatus of claim 17, wherein the transmitting module is further configured to transmit the directional pilot signal at least on the pilot channel resource.

25. A computer readable storage device, comprising at least one executable instruction, which, in response to execution, causes a system comprising a processor to perform operations, comprising:
acquiring information associated with a pilot channel resource used to send at least one directional pilot signal associated with a directional device to device (D2D) communication, wherein the directional D2D communication refers to D2D communication using directional transmission over a D2D communication link, the directional transmission refers to transmission of a radio frequency signal in a first specific direction, and the at least one directional pilot signal refers to at least one pilot signal transmitting in a second specific direction; and
transmitting a data signal associated with the directional D2D communication at least according to a received state of the at least one directional pilot signal on the pilot channel resource,
wherein a direction associated with the directional D2D communication is determined by one party of both parties of communication according to a position of the other party, or determined from two or more candidate directions according to communication performances and interference conditions of the two or more candidate directions.

26. A device to device (D2D) communication device comprising:
a processor and memory, wherein the memory stores executable instructions, the processor being connected with the memory via a communication bus, and when the device is operating, the processor executes or facilitates execution of the executable instructions stored by the memory to perform operations, comprising:
acquiring information associated with a pilot channel resource used to send a directional pilot signal associated with a directional D2D communication, wherein the directional D2D communication refers to D2D communication using directional transmission over a D2D communication link, the directional transmission refers to transmission of a radio frequency signal in a first specific direction, and the directional pilot signal refers to a pilot signal transmitting in a second specific direction; and
transmitting a data signal associated with the directional D2D communication at least according to a received state of the directional pilot signal on the pilot channel resource,
wherein a direction associated with the directional D2D communication is determined by one party of both parties of communication according to a position of the other party, or determined from two or more candidate directions according to communication performances and interference conditions of the two or more candidate directions.

* * * * *